INVENTORS
BERNHARD T. JUNKER
ROSS M. HEDRICK
BY
Robert E. Hartenberger
ATTORNEY

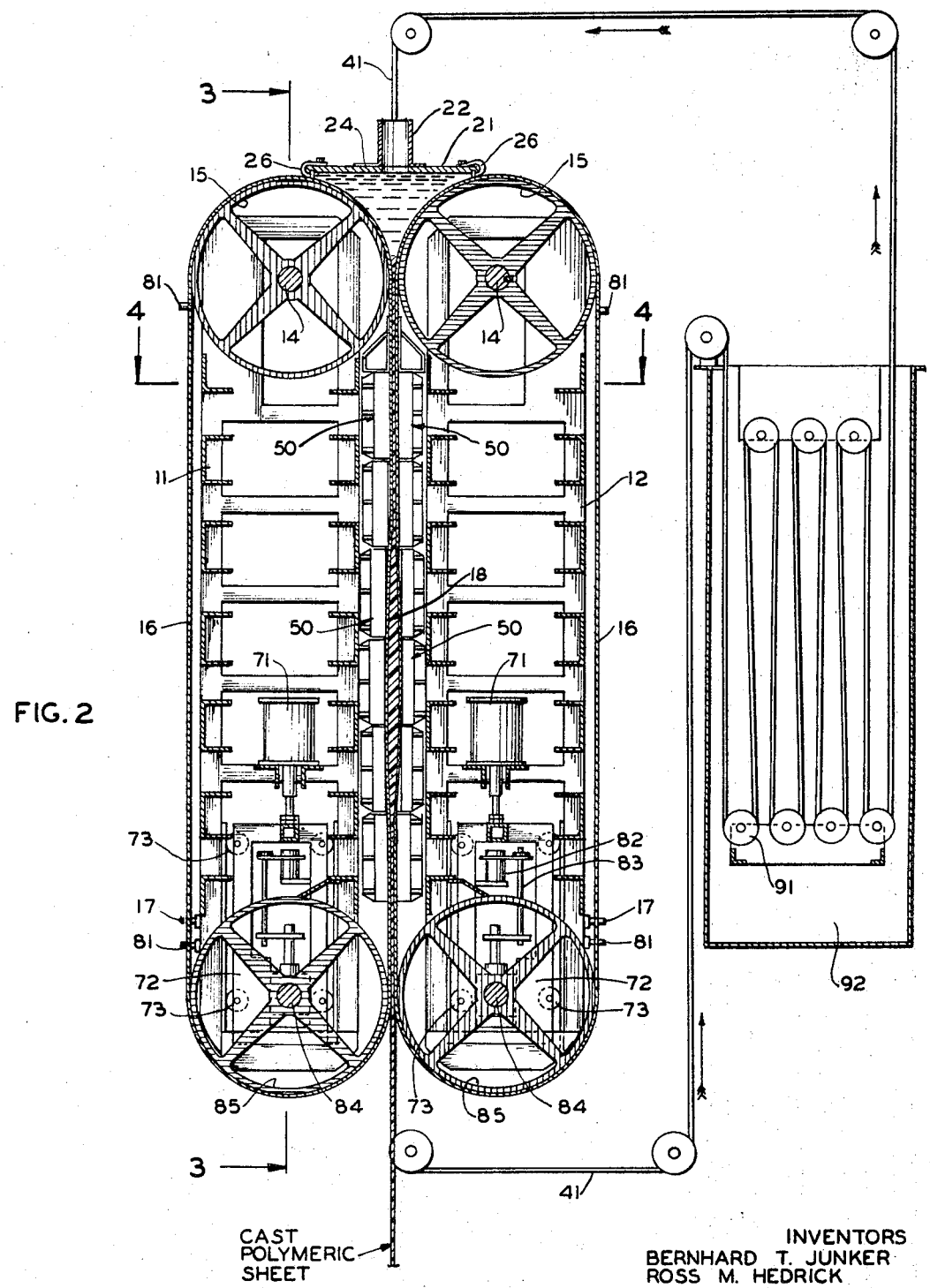

INVENTORS
BERNHARD T. JUNKER
ROSS M. HEDRICK

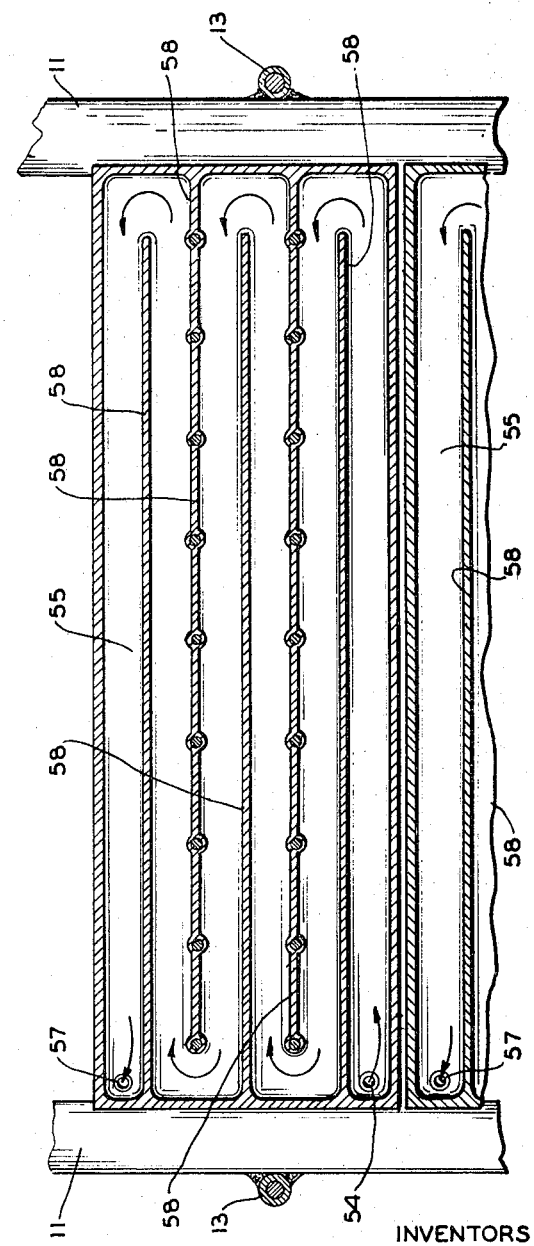
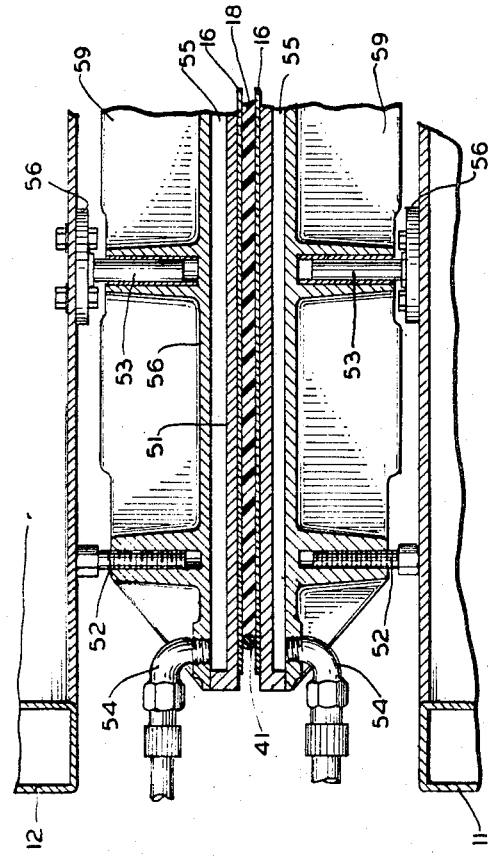

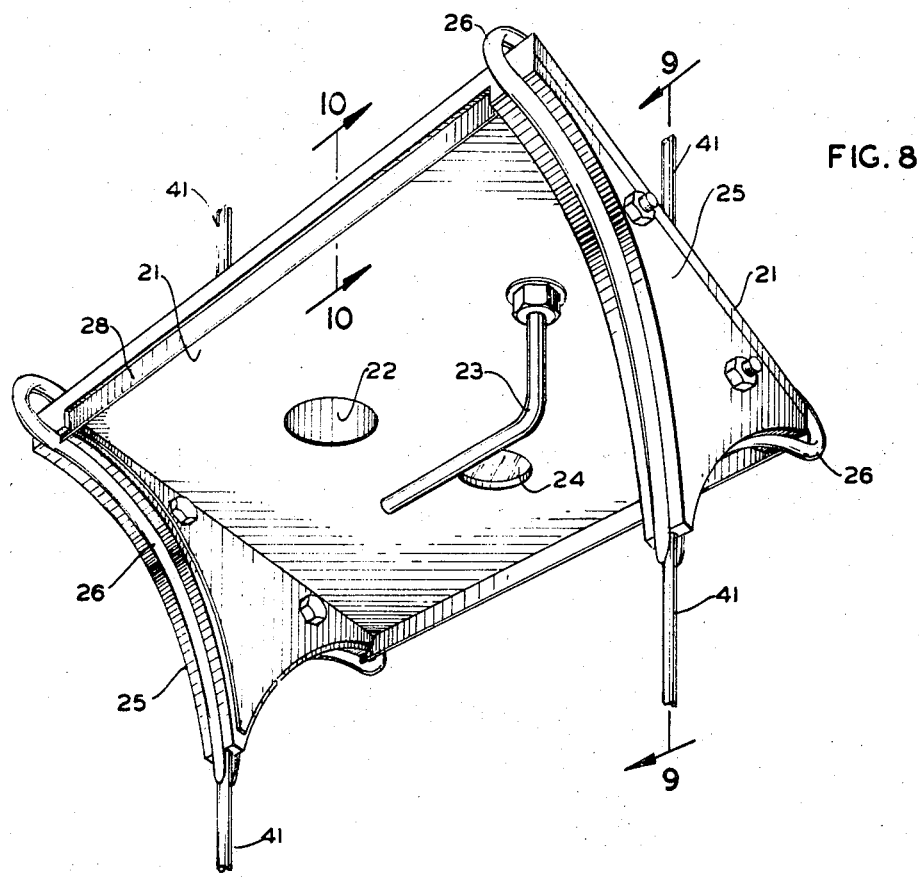
FIG. 8
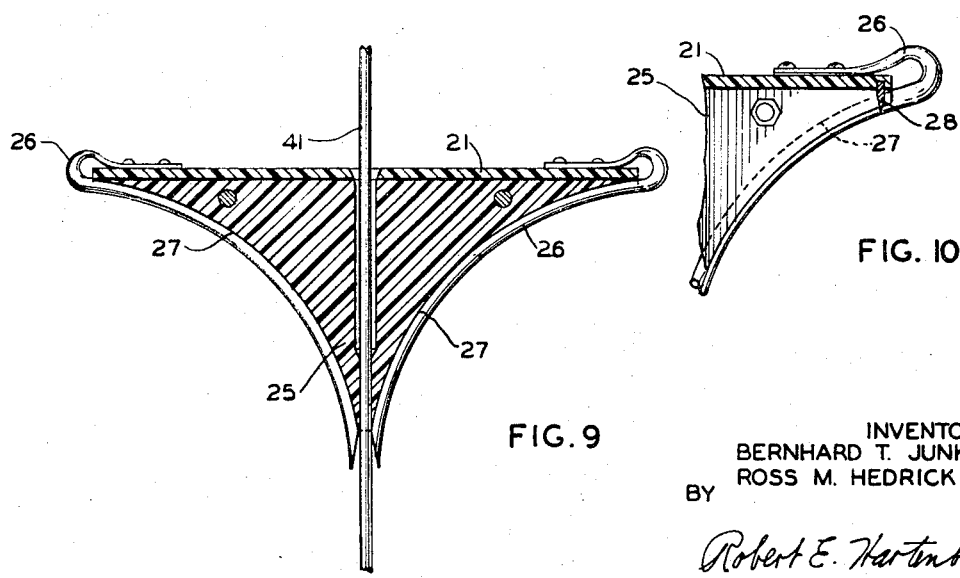
FIG. 9
FIG. 10
INVENTORS
BERNHARD T. JUNKER
ROSS M. HEDRICK
BY
*Robert E. Hartenberger*
ATTORNEY United States Patent Office 3,422,178
Patented Jan. 14, 1969

3,422,178
**CONTINUOUS POLYMER CASTING MACHINE
AND PROCESS**
Bernhard T. Junker, Creve Coeur, and Ross M. Hedrick,
St. Louis, Mo., assignors to Monsanto Company, St.
Louis, Mo., a corporation of Delaware
Filed Oct. 12, 1965, Ser. No. 495,284
U.S. Cl. 264—216                          18 Claims
Int. Cl. B29d 7/14

ABSTRACT OF THE DISCLOSURE

Machinery for casting polymeric sheets comprising two endless belts positioned to form opposing surfaces of a mold for a portion of their length, means for driving the belts and restraining means for holding the belts in a position suitable for molding polymerizing material into polymeric sheets. Also described is a process for continuously casting the polymeric sheets or film comprising casting a liquid monomeric feed into a mold cavity, the faces of which mold cavity are moving, positioning restraining means for the faces of said mold to provide a mold cavity contoured to accommodate the expansion and contraction of the feed as it moves through the mold cavity, and withdrawing a solid polymerized article from the exit of the mold cavity.

---

This invention relates to machines useful for continuously casting a polymer into a finished shape and to a process for preparing a polymeric sheet utilizing a machine of the type described herein below. In one principal aspect, this invention relates to a machine having a pair of flexible belts which are moved through a casting region along with the solidifying polymer, thereby causing the finished polymer to emerge from the machine in the form of a film or sheet. In another aspect, this invention relates to a process for producing a polymeric sheet in finished form.

The art of forming polymeric compositions into films and sheets has progressed steadily for the past several years. Various techniques such as extrusion molding, compression molding and vacuum molding have been developed to produce plastic films and sheets having widely varying dimensions for several different uses. Plastic film and sheet have also been prepared by calendering formed polymer on calendering rolls. A third type of fabricating technique used to produce plastic film or sheet is the casting of a fluid polymer or polymerizable monomer into a mold or onto a surface and subsequently solidifying the mass to form a finished article. The fluid material being cast can be either a molten polymer or a polymerizable monomer in the liquid state.

Techniques for casting plastic film and sheet have certain advantages over other processes for forming similar articles. Usually the equipment is simpler since relatively mild operating pressures and temperatures are employed. Further, moderate molding temperatures are desirable when processing polymers with a low decomposition temperature. And if a monomer can be polymerized during the casting operation, it is possible to prepare a finished article directly from the monomeric raw materials, thereby eliminating the two-stage polymerization-molding operation used in the fabrication of most thermoplastic articles.

Disadvantages in casting finished thermoplastic articles by comparison to molding, can include the production of mechanically weak, sometimes unattractive finished articles. Such undesirable characteristics in plastic articles are often caused by the viscous nature of the material being cast. The normally moderate temperatures and pressures used in a casting process are often insufficient to alter the flow characteristics of the cast material enough to insure its even distribution throughout the mold. Further, it has been difficult to devise techniques for the continuous production of as good quality cast film or sheet as can be achieved by continuous extrusion, injection molding or compression molding techniques. Additional problems are encountered when casting certain monomer systems directly into finished polymeric sheet. Some monomer systems undergo a series of rapid expansions and contractions as heating, cooling and chemical reactions are taking place simultaneously or sequentially. To provide a satisfactory finished product, a casting machine should be capable of accommodating these rapid changes in volume and temperature without clogging, jamming, or otherwise interfering with the smooth flow of material through the machine. If for example, a machine cannot accommodate a rapid expansion of monomeric feed caused by a polymerization exotherm, the casting region will become clogged, thereby preventing issuance of a polymerized sheet. Further, if heat isn't supplied and removed at the correct locations along the casting zone, the finished product may be only partially polymerized, full of holes, or both.

It would be highly advantageous to devise a machine capable of producing good quality, cast plastic film and sheet on a continuous basis. It would be additionally advantageous to devise a process for continuously producing a cast polymeric material in the form of a film or sheet. Providing a machine and a process capable of achieving the above-described advantages constitute the principal objects of this invention. Additional objects, benefits and advantages will become apparent in view of the following detailed description, read in conjunction with the accompanying drawings in which:

FIGURE 1 is a perspective view of a casting machine capable of producing a continuous, cast polymeric sheet. The figure shows the feed inlet at the top and the product exit at the bottom of the drawing. For convenience of illustration, the various vessels and pumps used to store and to charge the liquid polymer or catalyzed monomer to the casting machine are not shown. A portion of the machine is broken away to show the positioning of the platens on the framework.

FIGURE 2 is a vertical sectional view of the machine shown in FIGURE 1, taken along the reference line 2—2, i.e. along a plane perpendicular to the axes of the rolls over which the flexible belts move. The detailed construction within the platens 50 is not shown here for purposes of clarity since FIGURES 5, 6 and 7 adequately show details of the platens.

FIGURE 6 is a vertical sectional view of a platen taken along the line 6—6 of FIGURE 4, showing the baffles and path of liquid circulation through the platen.

FIGURE 7 is a fragmentary horizontal sectional view of the machine taken along the line 7—7 of FIGURE 5, showing means available for laterally moving the platens toward or away from each other.

FIGURE 8 is a perspective view of the underside of the feed inlet reservoir.

FIGURE 9 is a vertical sectional view of the feed inlet reservoir taken along the line 9—9 of FIGURE 8.

And FIGURE 10 is an enlarged fragmentary vertical sectional view of the edge of the inlet reservoir, showing the flange sealing the enclosed reservoir from the outside.

The present invention is described as a continuous polymeric sheet casting machine comprising a framework, first and second endless belts positioned in face-to-face relationship to each other for a portion of their lengths to form between their inside surfaces a mold cavity having an entrance and an exit, means attached to said framework and operatively associated with said belts for bringing said belts into face-to-face relationship at the entrance of said mold cavity, means attached to said framework and operatively associated with said belts for disrupting the face-to-face relationship of said belts at the exit of said mold cavity, belt driving means operatively associated with said belts, and mold cavity restraining means operatively associated with the outside surfaces of those portions of said belts forming said mold cavity, said restraining means being constructed to provide a mold cavity having a non-uniform thickness in its longitudinal dimension and a uniform thickness in its transverse dimension.

Figure 1:
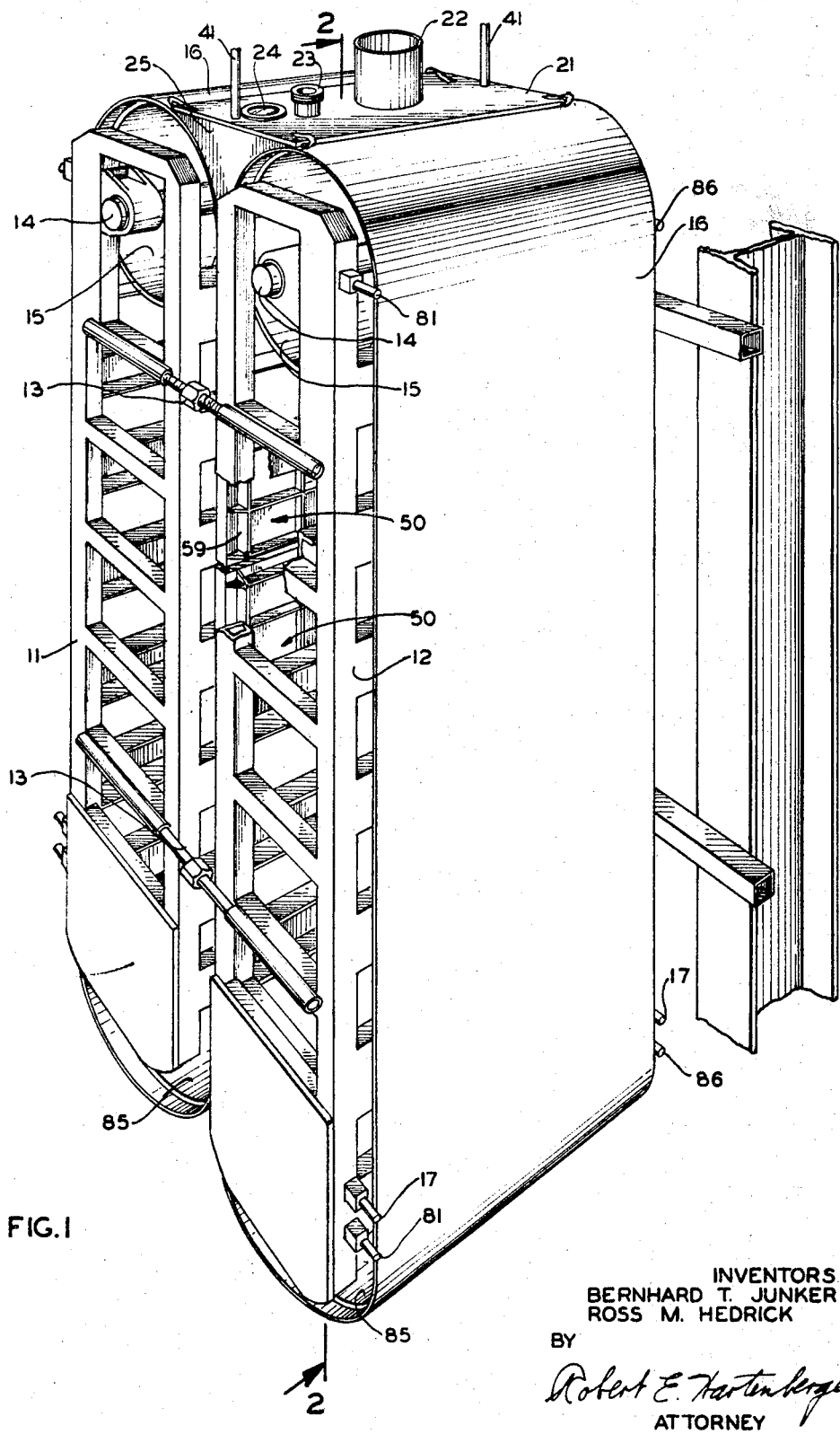
Figures 3, 5:
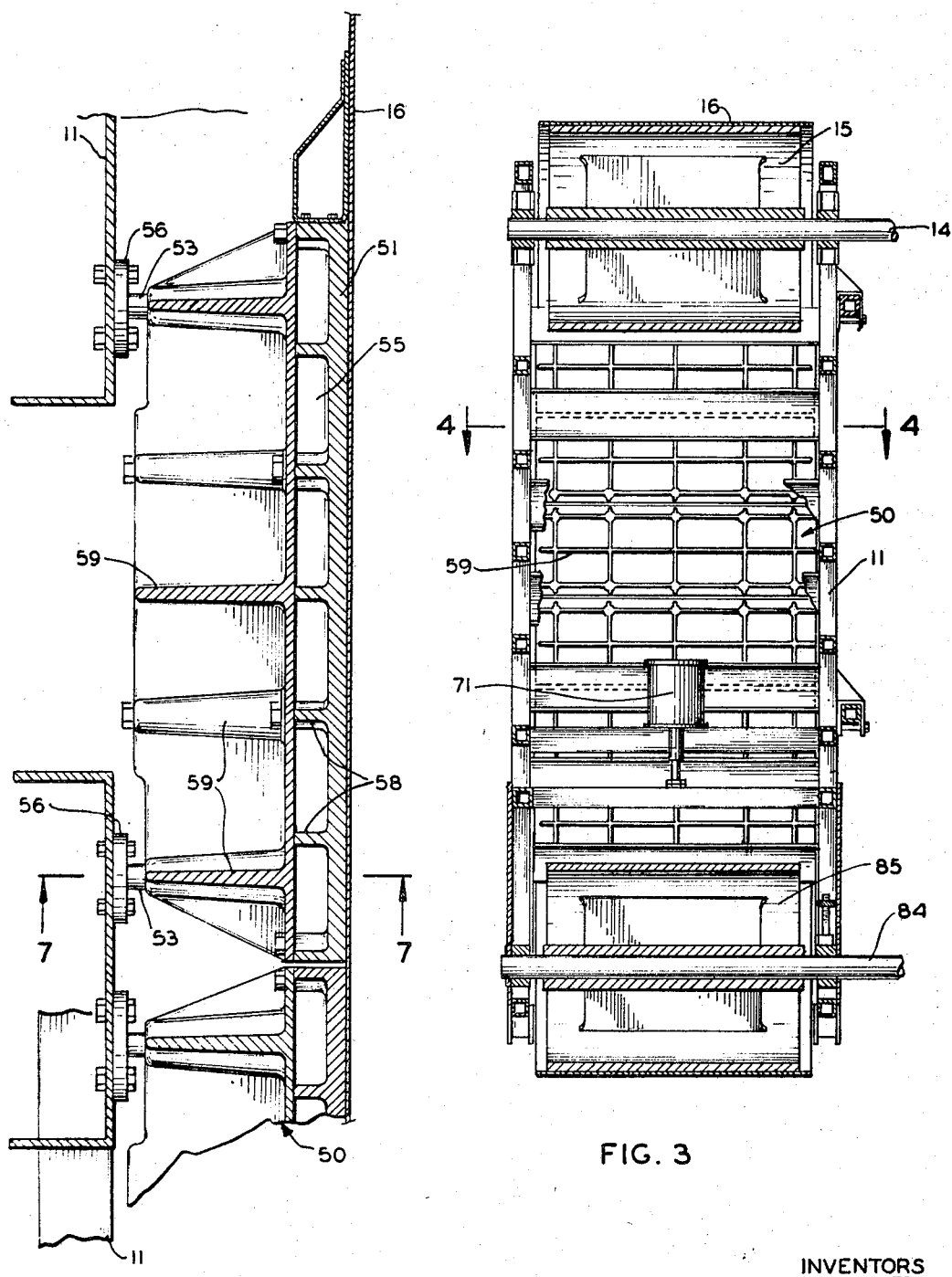
FIGURE 3 is a vertical sectional view of the machine partially broken away and taken along the line 3—3 of FIGURE 2.
FIGURE 5 is an enlarged vertical sectional view of a platen taken along the line 5—5 of FIGURE 4.
Figure 4:
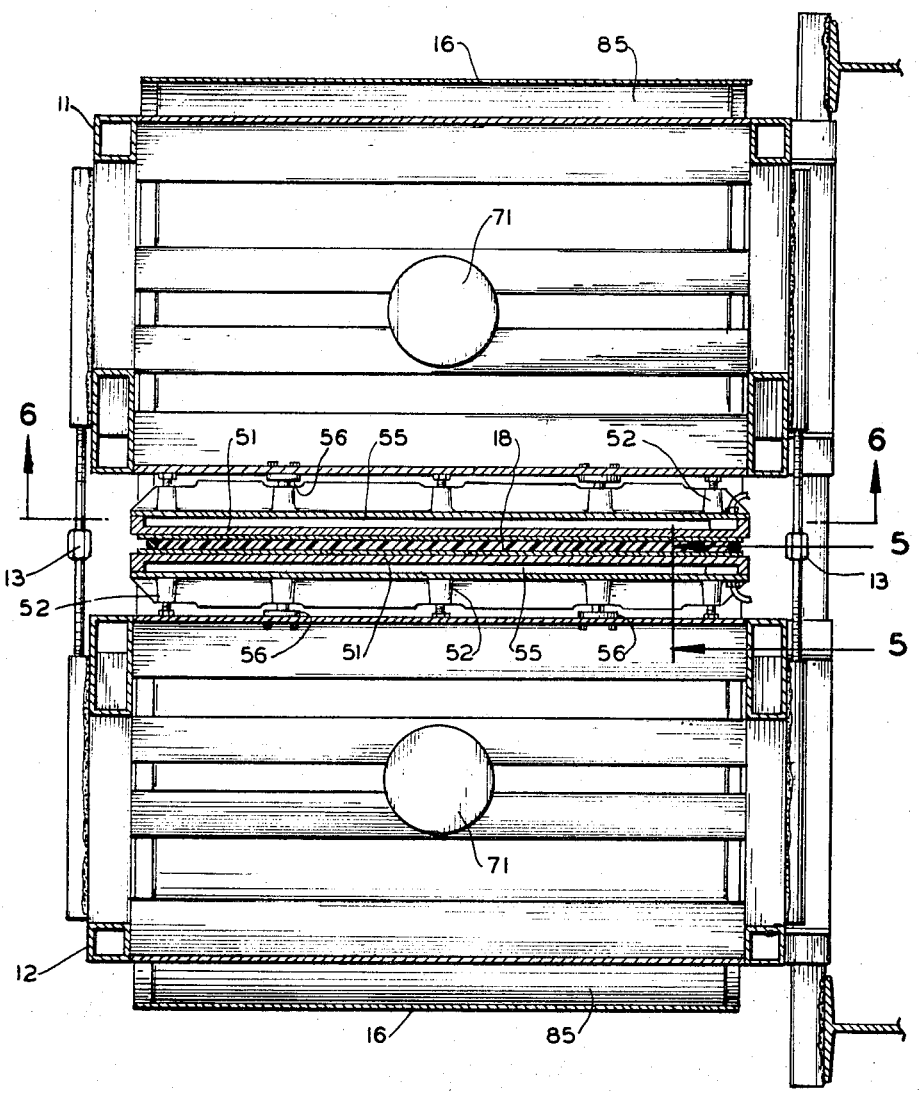
FIGURE 4 is a horizontal sectional view of the machine taken along the line 4—4 of FIGURE 3.

Referring to FIGURES 1 and 2, dual frames 11 and 12 each contain a pair of drums 15 and 85 mounted on axles 14 and axles 84 which are attached to frames 11 and 12. The distance between frames 11 and 12 is regulated by spacers 13. Positioned over each set of drums 15 and 85 is an endless flexible stainless steel belt 16. The two belts 16, together with tubular gaskets 41, form a mold cavity 18 between the interior surfaces of frames 11 and 12 and between the two sets of drums 15 and 85. The tubular gaskets 41 are pressed between the surfaces of belts 16 to form a leakproof seal of the mold cavity. Mounted on the interior faces of frames 11 and 12 are platens 50 which can provide heating and cooling zones for mold cavity 18 as well as provide support for flexible belts 16 when they are exposed to an outward pressure resulting from the introduction of a feed into the mold cavity. Tension on belts 16 can be adjusted by actuating air-driven cylinder 71, thereby causing carriages 72 upon which axles 84 are mounted to move on bearings 73 in an upward or downward direction. As belts 16 move along over drums 15 and 85, any tendency of the belts to slip off the drums is corrected by a tracking mechanism comprising tracking sensors 81 and 86 which upon detecting the edge of belt 16 activate motor 82 which is connected to axle 84 through a linkage 83. Activation of motor 82 tilts one end of axle 84 upward or downward, depending upon which tracking sensor, 81 or 86, is activated. Tilting of axle 84 results in a corresponding tilt of drum 85 which in turn causes the belt 16 moving over the surface of drum 85 to be returned to a proper tracking position. If the tracking correction mechanism fails to correct the lateral movement of belt 16, limit switches 17 will be activated and will cut off power to axles 14 to prevent serious damage to the belts.

As belts 16 move parallel to each other between drums 15 and 85 and within the interior of the machine, they form a casting region into which a liquid feed is cast and shaped into a flat polymeric sheet or film. To prevent the liquid feed from flowing out the sides of the mold cavity, sealing gaskets 41 are placed between the inside edges of belts 16. Gaskets 41 can be moved through the machine at the same rate as belts 16 and can be run over cleaning rollers 91 in a cleaning tank 92 before recycling to the mold cavity.

Positioned behind the interior surfaces of belt 16 are platens 50 which furnish zones of heating and cooling as well as provide surfaces upon which belt 16 can be restrained from unwanted bulging caused by the hydrostatic head of liquid material introduced into and held at a predetermined level within the inlet reservoir 21.

Referring to FIGURES 3 to 7, platens 50 have a surface 51 over which belts 16 move. Positioned behind the platens 50 is a grid of supporting ribs 59 which prevent deflection of the platens 50 by providing support against pressures from the hydrostatic head of liquid material in inlet reservoir 21. At some of the intersections of ribs 59, bushings have been provided to accept support pistons 53 and adjusting screws 52 for the platens. Support pistons 53 extend through ribs 59, thereby connecting the ribs with frame 11 or 12 through mounting plate 56. Adjusting screws 52 permit lateral position change of the platens, thereby providing a casting region 18 whose contour can vary along its length as well as remain uniform.

Within the platens is a chamber 55 which can be used for circulation of heating or cooling liquids. Liquid is introduced into a chamber 55 through inlet 54, circulates around baffles 58, transmits or withdraws heat from platen surface 51, and flows out exit 57.

FIGURES 8, 9 and 10 show in detail the inlet reservoir which fits over flexible belts 16 as they pass over drums 15 and move down into the casting region 18. The reservoir contains top plate 21 to which are attached two side plates 25. Located on top plate 21 are feed inlet 22, leveling control 23 and viewing glass 24. Sealing gaskets 41 pass through top plate 21 and side plates 25 and are pressed between belts 16 to form a seal as they emerge from the inlet reservoir. Molten feed introduced into the inlet reservoir is prevented from escaping by seals 26 fitted into grooves 27, said grooves and seals being positioned along the edges of side plates 25. When the inlet reservoir is placed in the V-shaped trough formed by belts 16 passing over rollers 15, seals 26 are placed in intimate contact with belts 16 to form a leak-proof enclosure for the molten feed. Flanges 28 are positioned along the edges of top plate 21 at right angles to side plates 25 to exclude air from the molten feed, if the nature of the material being cast warrants such precautions.

Several modifications to, and configurations of, the casting machine and its component parts are included within the scope of the present invention. For instance, the machine as shown in FIGURES 1 and 2 utilizes a vertical mounting with feed introduction at the top. Alternatively, the machine can be modified to permit introduction of feed from the bottom or the position of the whole device can be changed to permit horizontal or diagonal operation of the device. Several of the figures show the positioning of tubular gaskets 41. FIGURE 2 additionally shows one means for cleaning the gasket material and reusing it. Obviously, cleaning and reusing the tubular gasket is not an indispensable feature of this invention and the gasket can be simply discarded after use. Or, depending upon gel conditions of the liquid feed, a relatively short, stationary length of gasket can be employed which extends along the encloses only a portion of the total casting region. Or other means for sealing the edges of the mold cavity can also be employed.

FIGURE 2 shows a view of a profile of the casting region in a casting machine embodying our inventive principle. The variation in mold thickness is exaggerated for purposes of illustration. Depending upon the nature of the liquid feed and any auxiliary additives the contour of the mold cavity can vary considerably from a very complex shape to nearly the simplest rectangular shape.

Although the device as depicted is quite versatile due to the many different shapes of mold cavities which can be formed, the present invention also includes devices having as few as two adjustable platens supporting each face of the mold. It is possible to use a device having only one platen supporting each mold face if the platens can be adjusted to provide a mold cavity with divergent mold faces, or if the platens have surfaces irregular in shape to provide preformed areas necessary for expansion and contraction of the feed as it moves through the mold. Although the machine described herein can be designed to operate with fixed platens, versatility of use requires that the platens be adjustable to provide mold cavities of varying thicknesses. With further regard to the platens, other means for heating and cooling can be employed in place of circulating liquids, as for example, electric heating located either within or outside the platens.

The number of heating and cooling zones can also be modified. It is preferred that the casting machine be equipped to provide at least two temperature zones along the length of the casting region although a casting region maintained at a uniform temperature is also included within the scope of the present invention.

The use of platens are particularly preferred for use in restraining the belts forming the mold cavity from unwanted bulging caused by the hydrostatic pressure exerted by the liquid feed in the mold cavity. The above preference is due largely to the advantage of effectively combining temperature control with the function of mold cavity shaping. The flat surfaces of the platens provide good heat transfer to the belts and ultimately to the mold cavity while at the same time providing effective support to the belts. If temperature control of the mold cavity is not an important feature or if it can be supplied by other means, rollers or other means for confining the belts to a desired contour can be substituted for the platens.

Regarding materials of construction, flexible steel belts have been described as suitable. Materials particularly preferred for use as a flexible endless belt are extra-low carbon stainless steels such as 304L or 316L or low carbon steels such as cold rolled steel C1008 or C1010. Other materials including woven glass and polymeric sheets, are also suitable for use with certain polymer systems. Those skilled in the art will become aware of many acceptable alternate materials.

Regarding the inlet reservoir, the particular design shown in FIGURES 8, 9 and 10 constitutes a preferred component of our casting machine. The design is such that a hydrostatic pressure of the feed can be attained which helps to insure a void-free casting and to maintain proper flow through the mold. One important feature of the feed inlet reservoir is the fixed gaskets attached to the side panels which contact the converging portion of the belts. The fixed gaskets extend beyond the side panels down into the entrance of the mold cavity. This feature provides a leakproof seal of the edges of the entrance of the mold cavity. Further, early contact of feed with flexible belts assists complete filling of the mold as well as good conformity of feed temperature with mold temperature at the onset of the casting cycle. The reservoir can also be constructed to prevent contact of air with the feed in the reservoir to prevent evaporation of volatile feed or both. If the liquid feed is quite fluid, has good heat conductance, is not unduly volatile and is not sensitive to the atmosphere, however, the use of such an inlet reservoir becomes of diminished importance and could be eliminated entirely, substituting in place thereof a direct injection of feed into the mold cavity.

A second aspect of the present invention is a process for continuously casting a polymeric sheet or film comprising casting a liquid feed into a moving mold cavity, expanding and contracting said feed as it is moved through said mold, converting said liquid feed to a solid polymer while said feed is being moved through said mold cavity, and withdrawing said polymer from the exit of said mold cavity.

The liquid feed can be either a molten polymer or a fluid monomer or prepolymer system. Generally, any thermoplastic resin which can be heated to form a fluid melt can be cast in the manner described above and molded into a finished sheet. Examples of suitable polymers include the polyolefins such as polyethylene and polypropylene, vinyl resins such as polyvinyl chloride, polyvinyl acetate and polyvinylidene chloride, polyamides such as nylon 6 and nylon 66, polystyrenes, polyesters, polycarbonates, polyacetals, acrylic resins such as polymethyl methacrylate and polyethyl acrylate, cellulosic resins such as ethyl cellulose, cellulose acetate, cellulose acetate butyrate and cellulose nitrate, polyethers, fluorocarbon resins, polyurethanes and other resins. Also useful herein are copolymers and interpolymers of the monomers used to prepare the above resins. Illustrative examples include copolymers of ethylene with vinyl chloride, styrene with acrylonitrile and many others.

The process of the present invention can also be practiced, utilizing any of a number of various monomer systems to produce either thermoplastic or thermosetting resinous sheet. The number and variety of monomer systems usable herein is limited only by the capability of the casting machine to function as a suitable reaction vessel for the systems. Safety factors such as danger from toxic fumes could prevent casting of styrene/acrylonitrile sheet unless extremely elaborate precautions are taken. An extremely lengthly polymerization time of a monomer system might negate any advantages acquired by a continuous casting process. Many other reasons exist which make some monomer systems more acceptable than others for use in our casting machine. Obviously, extensive modification of the machine would be necessary to accommodate normally gaseous monomers such as ethylene and propylene. But modifications well within the skill of the art can be made to adapt the machine to the continuous casting of any liquid monomeric system into a finished polymeric sheet. Examples of monomers particularly preferred for use herein because of their normally liquid state at suitable polymerization temperatures, their rapid polymerization time and general adaptability to use with the casting machine as shown in the accompanying figures, include the acrylic esters such as the lower alkyl methacrylates and acrylates and the lactams such as $\alpha$-pyrrolidone, butyrolactam, caprolactam, caprylolactam and dodecanolactam. Other examples of monomers and monomer combinations usable herein include styrene, formaldehyde, vinyl chloride, vinyl acetate, hexamethylenediamine and adipic acid, toluene diisocyanate and polyoxypropylene, melamine and formaldehyde, urea and formaldehyde, diallyl phthalate, maleic anhydride and dipropylene glycol, phenol and formaldehyde, furfuryl alcohol and many others.

In addition to utilizing monomers and polymers in our process, it is also possible to prepare mixtures of monomer and polymer for continuous casting in the machine described above. For instance, polymethyl methacrylate can be dissolved in monomeric methyl methacrylate to prepare a feed of proper viscosity. The mixture can then be charged to the casting regions of the machine where the monomer is polymerized and the whole mass solidified into a finished sheet. Or a polymer-monomer system can be selected to provide a polymer insoluble in a monomer at one temperature but miscible at a higher temperature, the net result being that a fluid suspension of polymer in monomer can be poured into the top of the mold, heated rapidly to form a viscous gel, and the monomer polymerized as the semisolid gel moves through the mold. An example of such a system is a polyvinyl chloride-methyl methacrylate mixture.

The liquid polymer or monomer feed can also have incorporated therein a quantity of an inorganic filler or fibrous reinforcement, examples being clays such as kaolinite or bentonite, minerals such as alumina, wollastonite, feldspar, mullite and quartz, glass fibers, asbestos, glass flakes and many other materials. Other suitable fillers include wood chips, cotton floc and cellulosic fibers. The quantity of filler can range from 5% or less by weight of the polymer or monomer up to 90% by weight or more, depending upon the granular or fibrous nature of the filter.

If the liquid feed is in the monomeric state, it may be desirable to add various catalysts, polymerization accelerators, cross-linking agents, stabilizers, plasticizers, pigments, dyes and other additives to the monomer slurry before casting. Liquid polymers may advantageously be cast by incorporation of some of the above or other additives.

Residence time in the mold cavity can vary, depending upon the speed of the belts, the temperature conditions within the casting region and the time required for solidification of the particular system chosen. The examples set forth below describe some preferred sets of conditions.

When a filler is incorporated into the liquid feed to form a slurry, a vertical positioning of the belts when they are arranged in face-to-face relationship is particularly preferred. A vertical positioning of the mold cavity provides a sheet having an even distribution of filler throughout its dimensions. A horizontal or diagonal positioning of the casting region, on the other hand, will ordinarily provide a sheet having a filler-rich side and a polymer-rich side, especially if the specific gravity of the filler differs from the specific gravity of the liquid feed. For certain special uses, a finished sheet having a polymer-rich and a filler-rich side may be desirable; but for most uses, a uniform product is preferred, hence the preference for the vertical positioning of the casting region.

The thickness of the mold cavity, i.e. the distance between that portion of the moving belts in face-to-face relationship can vary along the length of the mold. In general, monomer systems require a mold profile different from a mold profile suitable for preformed polymers being cast. And each monomer or polymer system will be best accommodated by a mold contour which provides for expansions and contractions due to external heating and cooling as well as due to polymerization exotherms and passage through glass transition temperatures. As can be readily recognized optimum mold contours will vary considerably, depending upon the particular liquid feed being used.

Some means of restraining the liquid feed within the casting region until it has solidified enough to keep from running out is necessary. As shown above, the casting region can be sealed with a tubular gasket such as rubber tubing which is located along the edges of the belts and is pressed between the belts to form a leakproof seal. The gasket can be either stationary or can move along with the belts. It is possible that the feed can be chosen to provide a semisolid or solid sheet shortly after introduction to the mold, in which case the tubular gaskets need enclose only a portion of the mold cavity.

Conversion of liquid feed to a solid polymer can be accomplished merely by cooling the feed if it is a molten polymer. If the feed contains monomer, conditions should be such that the finished material emerging from the machine is substantially polymerized. This can be achieved by proper combination of feed temperature upon introduction to the temperature zones within the mold, residence time within the mold and catalyst or curing systems.

After solidification of the polymeric sheet, the mold closure is opened by the continued motion of the endless flexible belts around rotating drums at the exit of the machine. As the belts are rotated around the drums back toward the mold entrance, the finished polymeric sheet emerges for whatever post-treatment is deemed advisable, if any.

A process closely related to the process just described is a method for continuously casting foamed polymeric sheet comprising introducing expandable polymeric granules into a moving mold cavity, preheating said granules in a preheating zone within said mold cavity to expand them but not fuse them, adjusting the thickness of the mold cavity and the temperature of the mold cavity beyond the preheating zone to cause the expanded granules to be fused together in a fusing zone, cooling the fused expanded granules beyond the fusing zone in a cooling zone to form a foamed polymeric sheet, and withdrawing said sheet from the exit of said mold cavity.

The following examples set forth some preferred operating conditions and mold dimensions useful for certain specified feed systems. It should be understood that the examples are in no way limiting, but rather merely illustrative since other sets of conditions can be used for the same or for different feed systems. Quantities of materials are reported in parts by weight.

EXAMPLE 1

Quantities of the following materials are mixed together and stored at room temperature:

| | Parts |
|---|---|
| Methyl methacrylate | 23.94 |
| Acrylonitrile/butadiene copolymer (Hycar 1432) | 1.68 |
| Nonylphenol-ethylene oxide condensation product (Tergitol NP-27) | 0.07 |
| Tetraethyleneglycol dimethacrylate | 1.20 |
| Tetrahydrothiophene-1,1-dioxide | 0.99 |
| Wollastonite (P-1) | 35.90 |
| Mullite (35 mesh) | 35.90 |
| Carbon black | 0.005 |
| Cumene hydroperoxide | 0.31 |

The wollastonite and mullite used in the above formulation are pretreated with 0.25% by weight of 3-trimethoxysilylpropyl methacrylate. Treatment is accomplished by mixing the two materials for 15 minutes at 100° C. followed by 5 or 10 minutes heating at 150° C.

The machine, depicted in the accompanying figures, is mounted vertically to permit feed introduction at the top. The machine has six movable platens 18 inches long and 56 inches wide. The casting region formed by the two belts is approximately equivalent to the distance between axles 14 and 84, which is twelve feet. The gap between each pair of opposing platens is as follows:

| Platens: | Inches |
|---|---|
| 1 | .200 |
| 2 | .204 |
| 3 | .208 |
| 4 | .212 |
| 5 | .216 |
| 6 | .220 |

Because of a belt thickness of 0.040 inch, the actual width of the casting region will be approximately 0.080 inch smaller than the platen gap. The top five pairs of platens are heated to provide a heating zone of 95° C., the bottom platens provide a cooling zone of 23° C. The belt speed is adjusted to 6.7 inches per minute to provide a residence time of 13.4 minutes in the heating zone. The flexible gaskets are run down the edges of the belts and a length of the same material is placed between the moving belts in a transverse position to seal the moving mold. The feed reservoir is installed in position and the reservoir filled with the methacrylate monomer slurry described above. As the level of liquid feed in the reservoir falls due to its flow through the moving mold, the liquid level control 23 is actuated which in turn causes additional monomer slurry to be added to the reservoir. The polymerized product, a reinforced sheet of polymethyl methacrylate, emerges from the bottom of the machine in the form of a smooth, rigid sheet having an adequate appearance and surface finish, marred only occasionally by a small imperfection such as a shallow spot, pit or unevenness. The finished sheet is acceptable for use as a floor covering.

EXAMPLE 2

Example 1 is repeated exactly except that the gap width between platens is adjusted as follows:

| Platens: | Inch |
|---|---|
| 1 | .200 |
| 2 | .204 |
| 3 | .208 |
| 4 | .212 |
| 5 | .210 |
| 6 | .208 |

The polymerized product, which emerges from the bottom of the machine has an excellent appearance and surface finish, containing no significant mars or imperfections.

EXAMPLE 3

Quantities of the following materials are mixed together and stored at room temperature:

| | Parts |
|---|---|
| Methyl methacrylate | 24.01 |
| Acrylonitrile/butadiene copolymer (Hycar 1432) | 1.68 |
| Nonylphenol-ethylene oxide condensation product (Tergitol NP–27) | 0.07 |
| Tetraethyleneglycol dimethacrylate | 1.20 |
| Wollastonite (P–1) | 36.01 |
| Mullite (35 mesh) | 36.01 |
| Pigment (cadmolith) | 0.60 |
| 2–4 dichlorobenzoyl peroxide | 0.42 |

The same machine and settings are used as described in Example 2 except that the belt speed is adjusted to 8.5 inches per minute to provide a residence time of 10.6 minutes in the heating zone. The polymerized product which emerges from the bottom of the machine has an excellent appearance and surface finish, containing no significant mars or imperfections.

EXAMPLE 4

Quantities of the following materials are mixed together and stored at room temperature:

| | Parts |
|---|---|
| 20% solution of polymethyl methacrylate and methyl methacrylate monomer | 100 |
| Tetraethyleneglycol dimethacrylate | 5 |
| Cumene hydroperoxide | 0.003 |
| Tetrahydrothiophene-1,1-dioxide | 1.3 |

The machine described in the previous example utilizes the following gapped widths between the platens:

| Platens: | Inches |
|---|---|
| 1 | .202 |
| 2 | .204 |
| 3 | .208 |
| 4 | .212 |
| 5 | .208 |
| 6 | .204 |

The top five pairs of platens are heated to provide a heating zone of 90° C.; the bottom platens provide a cooling zone of 25° C. The belt speed is adjusted to 7 inches per minute to provide a residence time of 13 minutes in the heating zone. The polymerized product which emerges from the bottom of the machine has an excellent appearance and surface finish containing only infrequent bubbles or imperfections in the sheet.

EXAMPLE 5

Quantities of the following materials are mixed together at room temperature:

| | Parts |
|---|---|
| Methyl methacrylate | 35 |
| Wollastonite pretreated with 0.25% trimethoxysilylpropyl methacrylate | 65 |
| A saturated acrylic rubbery polymer (Hycar 4021) | 2.3 |
| Cumene hydroperoxide | 1.0 |
| A solution of a triethylborane/pyridine complex in a nonylphenolethylene oxide condensate (Tergitol NP–27) | 3.5 |

The above complex is prepared by adding 140 grams of triethyl borane to a solution of 115 ml. of pyridine and 341 ml. of the condensate.

Using the machine described in Example 1, a 4 x 8 foot section of ¾" plywood is placed just above the belts with the 8 foot dimension positioned vertically. To permit the movement of the plywood sheet through the casting region, the feed reservoir used in the previous examples is replaced with two feed reservoirs mounted approximately ¾ inch apart. The reservoirs are also shortened to provide for the introduction of feed along four foot width of the casting zone corresponding to the placement of the plywood sheet. Gaskets are run between the feed reservoirs and adjacent to the sheet, thus forming two casting molds, one of each side of the plywood sheet. The gaps between the pairs of opposing platens are as follows:

| Platens: | Inches |
|---|---|
| 1 | 1.080 |
| 2 | 1.082 |
| 3 | 1.084 |
| 4 | 1.086 |
| 5 | 1.088 |
| 6 | 1.086 |

The top 5 pairs of platens are heated to provide a heating zone of 65° C.; the bottom platens are regulated to provide a cooling zone of 23° C. The belt speed is adjusted to 4.5 inches per minute to provide a residence time of 20 minutes in the heating zone. The reservoirs are filled with the monomer slurry and the plywood is lowered into the casting region at the same rate of speed as the belts are moving. Sufficient slurry is added to provide the necessary coating on the plywood. From the bottom of the machine, the plywood sheet emerges with a high quality, ⅛ inch coating of reinforced polymethyl methacrylate on each side.

EXAMPLE 6

Quantities of the following materials are mixed together at 150° C. in the absence of oxygen:

630 parts of ε-caprolactam,
782 parts of wollastonite and
1588 parts of mullite, both of which minerals are pretreated with 0.5% N-3-triethoxysilylpropylamine,
15 parts of triethoxydecylsilane,
9.1 parts of an 80/20 mixture of 2,4- and 2,6-diisocyanatotoluene (D–80) and
0.5 part of zinc stearate.

Using the machine described in Example 1, gaps between opposing platens in the machine are as follows:

| Platens: | Inches |
|---|---|
| 1 | .200 |
| 2 | .204 |
| 3 | .208 |
| 4 | .210 |
| 5 | .210 |
| 6 | .210 |

The top five pairs of platens are heated to provide a heating zone of 175° C.; the bottom platens are adjusted to provide a cooling zone of 25° C. The portions of the belts outside the casting region are preheated to 120° C. to insure satisfactory temperature control within the mold cavity. The feed reservoir is modified to permit the delivery of two tubular gaskets down each edge of the belt, one adjacent the other, thus insuring the exclusion of air from the polymerizing material. A blanket of nitrogen is used to exclude air from the monomer slurry held in the feed reservoir. The belt speed is adjusted to 5.0 inches per minute to provide a residence time of 18 minutes in the heating zone. As the monomer slurry is added to the feed reservoir, a quantity, equivalent to 5% by weight of the caprolactam, of a 3 molar solution of ethyl magnesium bromide in diethyl ether is mixed with the slurry. The remainder of the procedure is carried out as described in Example 1. The finished product, a reinforced sheet of polycaprolactam, has an excellent surface finish free from any significant imperfections.

EXAMPLE 7

The gaps between the platens of the casting machine are adjusted as follows:

| Platens: | Inches |
| --- | --- |
| 1 | .420 |
| 2 | .460 |
| 3 | .500 |
| 4 | .460 |
| 5 | .420 |
| 6 | .420 |

The top three pairs of platens are heated to provide a preheating zone of 100° C.; the next two pairs of platens are heated to provide a heating zone of 150° C.; the bottom platens are adjusted to provide a cooling zone of 25° C. The belt speed is adjusted to 5.0 inches per minute. The liquid level control in the feed reservoir is inactivated and partially pre-expanded polystyrene beads are added to the feed reservoir. As the beads are moved down into the mold cavity, additional polymer beads are added to the reservoir. The beads are expanded into larger discrete particles as they are heated at the top of the mold and are then fused together as they move further down through the mold. The fused beads are then cooled before they leave the machine. The finished product, a sheet of foamed polystyrene, which emerges from the bottom of the machine, contains beads uniformly well-expanded and fused together. The sheet is of uniform thickness and has a good surface and cross-sectional appearance. By providing for a progressive increase in size and then a decrease, both pre-expansion and fusion can take place in the machine.

The above examples demonstrate the versatility of the casting machine of this invention. Although the machine and its attendant method of operation have been described in terms of specified embodiments, it should be understood that the invention is not necessarily limited thereto since alternative embodiments will become apparent to those skilled in the art in view of this disclosure. For instance, horizontal or diagonal positioning of the machine is possible, particularly if the components of the feed are of uniform specific gravity. Another modification could be the lubrication of the interface between the platens and the belts, thereby permitting larger pressures to be applied to the polymeric contents of the mold cavity without undue wear on the belts. Accordingly, these and other modifications are contemplated which can be made without departing from the spirit of the described invention.

What is claimed is:

1. A process for continuously casting a polymeric sheet or film comprising casting a liquid monomeric feed into a moving mold cavity, said cavity comprising a first zone having a certain average thickness followed by a second zone having an average thickness greater than the first zone, followed by a third zone having an average thickness less than the second zone polymerizing and solidifying said feed as it is moved through said mold, by converting to a solid polymer and withdrawing said solid polymer from the exit of said mold cavity.

2. A process according to claim 1 wherein said liquid feed is a catalyzed polymerizable monomer.

3. A process according to claim 2 wherein said monomer is a lower alkyl methacrylate.

4. A process according to claim 3 wherein an acrylic polymer is dissolved in said lower alkyl methacrylate.

5. A process according to claim 2 wherein said monomer is a lactam.

6. A process according to claim 1 wherein said mold cavity is positioned vertically and wherein said liquid feed is introduced at the top of said mold cavity.

7. A process according to claim 6 wherein a reservoir of liquid feed is maintained above said mold cavity to cause the feed within the mold cavity to exert an increased pressure against the surfaces of the mold cavity.

8. A process according to claim 7 wherein said liquid feed further contains a filler having a specific gravity different from the specific gravity of the liquid feed.

9. A continuous polymeric sheet casting machine comprising a framework, first and second endless belts positioned in face-to-face relationship to each other for a portion of their lengths to form between their inside surfaces a mold cavity having an entrance and an exit, means attached to said framework and operatively associated with said belts for bringing said belts into face-to-face relationship at the entrance of said mold cavity, means attached to said framework and operatively associated with said belts for disrupting the face-to-face relationship of said belts at the exit of said mold cavity, belt driving means operatively associated with said belts, and mold cavity restraining means operatively associated with the outside surfaces of those portions of said belts forming said mold cavity, said restraining means being positioned to provide a mold cavity having a non-uniform thickness in its longitudinal dimension and a uniform thickness in its transverse dimension said mold cavity comprising a first zone having a certain average thickness, a second zone having an average thickness greater than the first zone, and a third zone having an average thickness less than the second zone.

10. A continuous polymeric sheet casting machine according to claim 9 wherein said mold cavity restraining means are connected to said framework through an adjustable linkage to permit said mold cavity restraining means to be moved in a line perpendicular to the longitudinal axis of the mold cavity.

11. A continuous polymeric sheet casting machine according to claim 10 wherein said mold cavity restraining means comprises at least two separately adjustable sections for each surface of the mold cavity.

12. A continuous polymeric sheet casting machine according to claim 9 wherein said mold cavity restraining means are temperature controlled platens.

13. A continuous polymeric sheet casting machine according to claim 9 wherein the entrance and exit of said mold cavity are positioned vertically with respect to each other.

14. A continuous polymeric sheet casting machine according to claim 9 wherein temperature control means are operatively associated with said mold cavity.

15. A continuous polymeric sheet casting machine according to claim 14 wherein said temperature control means are operatively associated with said mold cavity restraining means to provide temperature control of the mold cavity.

16. A continuous polymeric sheet casting machine according to claim 9 wherein mold cavity edge-sealing means are located between and are positioned in intimate contact with at least that portion of both belts which are placed in face-to-face relationship to each other at the entrance of said mold cavity.

17. A continuous polymeric sheet casting machine according to claim 9 wherein a feed inlet reservoir is positioned forward of the entrance to the mold cavity.

18. A feed inlet reservoir comprising at least two side panels positioned in transverse relationship to the longitudinal axes of said belts, two side panels being shaped to conform to the contour of said belts as they are brought into face-to-face relationship at the entrance of a mold cavity, formed by said belts and fixed sealing gaskets attached to the surfaces of said side panels contacting said belts, said gaskets extending beyond said surfaces and into the entrance of said mold cavity.

References Cited

UNITED STATES PATENTS

| | | | |
|---|---|---|---|
| 2,921,346 | 1/1960 | Fischer | 18—4 |
| 3,065,500 | 11/1962 | Berner | 264—53 XR |
| 3,110,941 | 11/1963 | Fagg | 18—4 |
| 3,214,793 | 11/1965 | Vidal | 264—51 XR |
| 3,236,789 | 2/1966 | Fuller | 260—2.5 |
| 3,257,484 | 6/1966 | Barnette | 264—47 |

FOREIGN PATENTS

| | | |
|---|---|---|
| 48,155 | 5/1964 | Poland. |
| 539,108 | 2/1956 | Italy. |
| 587,042 | 1/1925 | France. |
| 842,267 | 9/1952 | Germany. |
| 1,136,263 | 12/1956 | France. |
| 1,165,798 | 6/1958 | France. |
| 1,180,049 | 12/1958 | France. |
| 1,467,792 | 12/1966 | France. |

JULIUS FROME, *Primary Examiner.*

P. E. ANDERSON, *Assistant Examiner.*

U.S. Cl. X.R.

18—4, 5, 6; 264—51, 316, 331

UNITED STATES PATENT OFFICE
CERTIFICATE OF CORRECTION

Patent No. 3,422,178                                                        January 14, 1969

Bernhard T. Junker et al.

It is certified that error appears in the above identified patent and that said Letters Patent are hereby corrected as shown below:

Column 13, line 8, "of said belts, two side panels" should read -- of two belts, said side panels --.

Signed and sealed this 31st day of March 1970.

(SEAL)
Attest:

Edward M. Fletcher, Jr.                             WILLIAM E. SCHUYLER, JR.
Attesting Officer                                             Commissioner of Patents